(12) United States Patent
Legner

(10) Patent No.: US 8,328,676 B2
(45) Date of Patent: Dec. 11, 2012

(54) POWER SPLIT TRANSMISSION

(75) Inventor: Jurgen Legner, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 441 days.

(21) Appl. No.: 12/679,515

(22) PCT Filed: Aug. 15, 2008

(86) PCT No.: PCT/EP2008/060760
§ 371 (c)(1),
(2), (4) Date: Mar. 23, 2010

(87) PCT Pub. No.: WO2009/047038
PCT Pub. Date: Apr. 16, 2009

(65) Prior Publication Data
US 2010/0204001 A1   Aug. 12, 2010

(30) Foreign Application Priority Data

Oct. 2, 2007 (DE) .......................... 10 2007 047 194
Jul. 16, 2008 (DE) .......................... 10 2008 040 443

(51) Int. Cl.
*F16H 47/04* (2006.01)

(52) U.S. Cl. .......................................... 475/82; 475/218

(58) Field of Classification Search .................. 475/80, 475/82, 83, 207, 211, 218; 74/730.1
See application file for complete search history.

(56) References Cited

U.S. PATENT DOCUMENTS

| | | | |
|---|---|---|---|
| 2,583,656 A | 1/1952 | Lay | |
| 2,808,737 A | 10/1957 | Bullard, III | |
| 3,023,638 A | 3/1962 | Westbury et al. | |
| 3,204,486 A | 9/1965 | Lalio | |
| 3,212,358 A | 10/1965 | Lalio | |
| 3,580,107 A | 5/1971 | Orshansky, Jr. | |
| 3,597,998 A * | 8/1971 | Ebert | 475/74 |
| 3,601,981 A | 8/1971 | Ifield | |
| 3,626,787 A | 12/1971 | Singer | |
| 3,714,845 A | 2/1973 | Mooney, Jr. | |
| 3,834,164 A | 9/1974 | Ritter | |
| 3,903,755 A * | 9/1975 | Polak | 475/82 |
| 4,019,404 A | 4/1977 | Schauer | |
| 4,121,479 A | 10/1978 | Schauer | |
| 4,434,681 A | 3/1984 | Friedrich et al. | |
| 4,446,756 A | 5/1984 | Hagin et al. | |
| 4,563,914 A | 1/1986 | Miller | |
| 4,776,233 A | 10/1988 | Kita et al. | |
| 4,813,306 A | 3/1989 | Kita et al. | |
| 4,976,664 A * | 12/1990 | Hagin et al. | 475/80 |
| 5,071,391 A | 12/1991 | Kita | |
| 5,421,790 A | 6/1995 | Lasoen | |

(Continued)

FOREIGN PATENT DOCUMENTS

AT    197 650 B    10/1957

(Continued)

*Primary Examiner* — Sherry Estremsky
(74) *Attorney, Agent, or Firm* — Davis & Bujold, PLLC

(57) ABSTRACT

A power split transmission for a working machine, such as a wheel loader, having a continuously variable power branch and a mechanical power branch that are summed with one another via a summing gear (13). The summing gear (13) can be connected, via a clutch for forward drive (4) and a clutch for reverse drive (8), to an input drive. The power split transmission has shafts (2, 7; 32, 33) and only a single clutch is located on each shaft.

10 Claims, 2 Drawing Sheets

U.S. PATENT DOCUMENTS

| | | | |
|---|---|---|---|
| 5,496,223 A * | 3/1996 | Jarchow | 475/72 |
| 5,643,122 A | 7/1997 | Fredriksen | |
| 5,667,452 A | 9/1997 | Coutant | |
| 5,682,315 A * | 10/1997 | Coutant et al. | 701/57 |
| 5,766,107 A | 6/1998 | Englisch | |
| 5,868,640 A | 2/1999 | Coutant | |
| 5,890,981 A | 4/1999 | Coutant et al. | |
| 6,029,542 A | 2/2000 | Wontner | |
| 6,056,661 A | 5/2000 | Schmidt | |
| 6,485,387 B1 | 11/2002 | Goodnight et al. | |
| 6,592,485 B2 | 7/2003 | Otten et al. | |
| 6,761,658 B1 | 7/2004 | Stettler, Jr. | |
| 7,063,638 B2 * | 6/2006 | Weeramantry | 475/74 |
| 7,097,583 B2 | 8/2006 | Lauinger et al. | |
| 7,354,368 B2 | 4/2008 | Pollman | |
| 7,448,976 B2 | 11/2008 | Hiraki et al. | |
| 2002/0042319 A1 | 4/2002 | Otten et al. | |
| 2003/0089107 A1 | 5/2003 | Tani | |
| 2003/0150662 A1 | 8/2003 | Tani | |
| 2003/0166430 A1 | 9/2003 | Folsom et al. | |
| 2004/0242357 A1 | 12/2004 | Ishizaki | |
| 2006/0094554 A1 | 5/2006 | Schmidt | |
| 2006/0276291 A1 | 12/2006 | Fabry et al. | |
| 2007/0277520 A1 | 12/2007 | Gollner | |
| 2007/0281815 A1 | 12/2007 | Gollner | |
| 2008/0085801 A1 | 4/2008 | Sedoni et al. | |
| 2008/0103006 A1 | 5/2008 | Pollman et al. | |
| 2008/0214349 A1 | 9/2008 | Liebherr et al. | |
| 2008/0214351 A1 | 9/2008 | Katayama et al. | |
| 2009/0270212 A1 | 10/2009 | Ueda et al. | |
| 2010/0056318 A1 | 3/2010 | Glockler | |

FOREIGN PATENT DOCUMENTS

| | | |
|---|---|---|
| DE | 1 069 978 | 11/1959 |
| DE | 976 055 | 1/1963 |
| DE | 1 174 126 | 7/1964 |
| DE | 1 952 966 | 4/1970 |
| DE | 27 57 399 A1 | 9/1978 |
| DE | 28 54 375 A1 | 6/1980 |
| DE | 29 04 572 A1 | 8/1980 |
| DE | 28 44 116 A1 | 7/1982 |
| DE | 80 18 579 U1 | 6/1984 |
| DE | 36 22 045 A1 | 3/1987 |
| DE | 42 06 023 A1 | 9/1993 |
| DE | 37 86 996 T2 | 12/1993 |
| DE | 94 02 493 U1 | 7/1995 |
| DE | 44 43 267 A1 | 6/1996 |
| DE | 197 51 993 A1 | 5/1998 |
| DE | 198 43 069 A1 | 5/1999 |
| DE | 100 03 174 A1 | 9/2000 |
| DE | 199 54 894 A1 | 12/2000 |
| DE | 100 47 398 A1 | 4/2002 |
| DE | 202 08 495 U1 | 1/2003 |
| DE | 601 03 717 T2 | 10/2004 |
| DE | 103 19 252 A1 | 11/2004 |
| DE | 10 2006 004 223 A1 | 8/2006 |
| DE | 10 2006 025 347 B3 | 12/2007 |
| DE | 10 2006 025 348 A1 | 12/2007 |
| DE | 11 2004 000 874 B4 | 4/2008 |
| DE | 10 2007 049 412 A1 | 5/2008 |
| EP | 0 234 135 A1 | 9/1987 |
| EP | 0 234 136 A1 | 9/1987 |
| EP | 0 235 466 A1 | 9/1987 |
| EP | 0 465 752 A1 | 1/1992 |
| EP | 0 577 282 A1 | 1/1994 |
| EP | 0 683 875 B1 | 4/1998 |
| EP | 1 541 898 A2 | 6/2005 |
| EP | 1 855 029 A2 | 11/2007 |
| EP | 1 930 627 A1 | 6/2008 |
| FR | 1197 751 A | 1/1958 |
| FR | 1 483 053 | 5/1966 |
| GB | 1 206 196 | 9/1970 |
| JP | 2007-85517 A | 4/2007 |
| WO | 86/00963 A1 | 2/1986 |
| WO | 99/15813 A3 | 4/1999 |
| WO | 00/43695 A3 | 7/2000 |
| WO | 2004/038257 A1 | 5/2004 |
| WO | 2004/072512 A1 | 8/2004 |
| WO | 2006/042434 A1 | 4/2006 |
| WO | 2007/014706 A1 | 2/2007 |
| WO | 2008/004360 A1 | 1/2008 |

* cited by examiner

POWER SPLIT TRANSMISSION

This application is a National Stage completion of PCT/EP2008/060760 filed Aug. 15, 2008, which claims priority from German patent application serial no. 10 2007 047 194.9 filed Oct. 2, 2007 and German patent application serial no. 10 2008 040 443.8 filed Jul. 16, 2008.

FIELD OF THE INVENTION

The invention relates to a power split transmission.

BACKGROUND OF THE INVENTION

Such power split transmissions have a continuously variable power branch and a mechanical power branch that are summed by a summing gear set.

The document DE 10 2006 004 223 A1 discloses a power split transmission with a continuously variable power branch and a mechanical power branch that are summed in a summing gear set, wherein the summing gear set consists of a planetary gear set with a double planetary gear, two sun wheels, and an internal geared wheel.

In working machinery, for example such as wheel loaders, the drive motor is positioned above the drive axle so that a transmission is needed that has a large axial distance between the input drive for the transmission and the transmission output drive. In addition, the structural space for the width and depth of the transmission is extremely limited in working machines, so that narrow, short transmissions with large axial separations are often used.

The underlying problem of this invention is to provide a power split transmission that makes possible a compact structure and a large axial separation.

SUMMARY OF THE INVENTION

The power split transmission should also be easy to shift from a first operating range to a second operating range. The problem is solved with a power split transmission of the type described that also has the characterizing features of the main claim.

In accordance with the invention, the power split transmission has a continuously variable power branch and a mechanical power branch.

The continuously variable power branch can be designed as a hydrostatic power branch that can have continuously variable hydrostatic units of swash plate design or inclined axle design. These hydrostatic units can be interconnected so that they can be varied by way of a common yoke. However, this can be set that so in a first position, the first hydrostatic unit is at zero displacement and the second hydrostatic unit exhibits its maximum displacement. In the second end position of the yoke, the first hydrostatic unit is adjusted to maximum displacement and the second hydrostatic unit is at zero displacement.

However, it is also possible to design the continuous units as electrical units. The continuously variable power branch and the mechanical power branch are summed in a summing gear set, with the summing gear set being designed as a planetary gear set that has at least one double planetary gear that meshes with a ring geared gear and two sun gears.

The power split transmission has shafts on which there are clutches, by means of which on the one hand a forward drive and a reverse drive can be switched, and on the other hand at least two operating ranges can be switched, and within which the output drive rotational speed can be continuously varied. The shafts are positioned apart from one another and there is only one single clutch on each shaft, so that a large axial separation and an otherwise compact transmission is provided. A clutch for forward drive and a clutch for reverse drive precede the summing gear set through gear wheels, whereby the clutches for the operating ranges can follow the summing gear set.

The clutch for forward drive is preferably positioned coaxially with the drive of the power split transmission, and the clutch for reverse drive is on a shaft separated from the clutch for forward drive. The gear ratios of the gear wheels are preferably designed so that the shaft that is connected to the clutch for reverse drive has a higher rotational speed than the drive shaft that is connected to the clutch for forward drive. This makes it possible to place one or more consumers on the shaft with the clutch for reverse drive, for example a hydraulic pump, which has sufficient rotational speed even with lower rotational speeds on the input drive to the transmission. This hydraulic pump, for example, can be used for the hydraulic supply of the transmission system, as well as for cooling and lubricating. Another hydraulic pump can be used to supply the working hydraulic mechanism.

The planet carrier of the summing gear set, which carries at least one double planetary gear, can be connected through gear wheels and the clutch for forward drive and the clutch for reverse drive, to the input shaft of the power split transmission. A first sun gear of the summing gear set is connected to the first continuously variable unit, and the ring gear of the summing gear set is in active connection with the second continuously variable unit. To switch to a first operating range, the second continuously variable unit is connected, via a clutch for the first operating range and other gears, to the output drive of the power split transmission. Except for the summing planetary gear set, the gear wheels of the power split transmission are designed as spur gears.

To switch to a second operating range, the clutch for the first operating range is actuated in the disengaging direction and the clutch for the second operating range is actuated in the engaging direction, so that the second sun gear of the summing planetary set can be brought into active connection with the output drive of the power split transmission.

The gear ratios of the range gears are chosen preferably so that at the end of the first operating range, at which the clutch for the first operating range is still engaged, the clutch for the second operating range has no differential rotational speed and can thus be engaged synchronously. During the change of ranges, the clutch for the first operating range is actuated in the disengaging direction and the clutch for the second operating range is actuated in the engaging direction, with only little need during this switch to correct the rotational speeds of the continuously variable units, for example the hydrostatic units, since the correction has to compensate only for leakage that occurs from the changing pressure conditions. When switching back from the second to the first operating range, the engaging and disengaging of the clutches take place in correspondingly different directions. In the second operating range, the second continuously variable unit is then adjusted from zero displacement toward maximum displacement, and the first continuously variable unit is adjusted from maximum displacement toward minimal displacement.

BRIEF DESCRIPTION OF THE DRAWINGS

Other features can be found in the Figures and Specification.

The Figures show.

DETAILED DESCRIPTION OF THE PREFERRED EMBODIMENTS

FIG. 1

Figure 1:
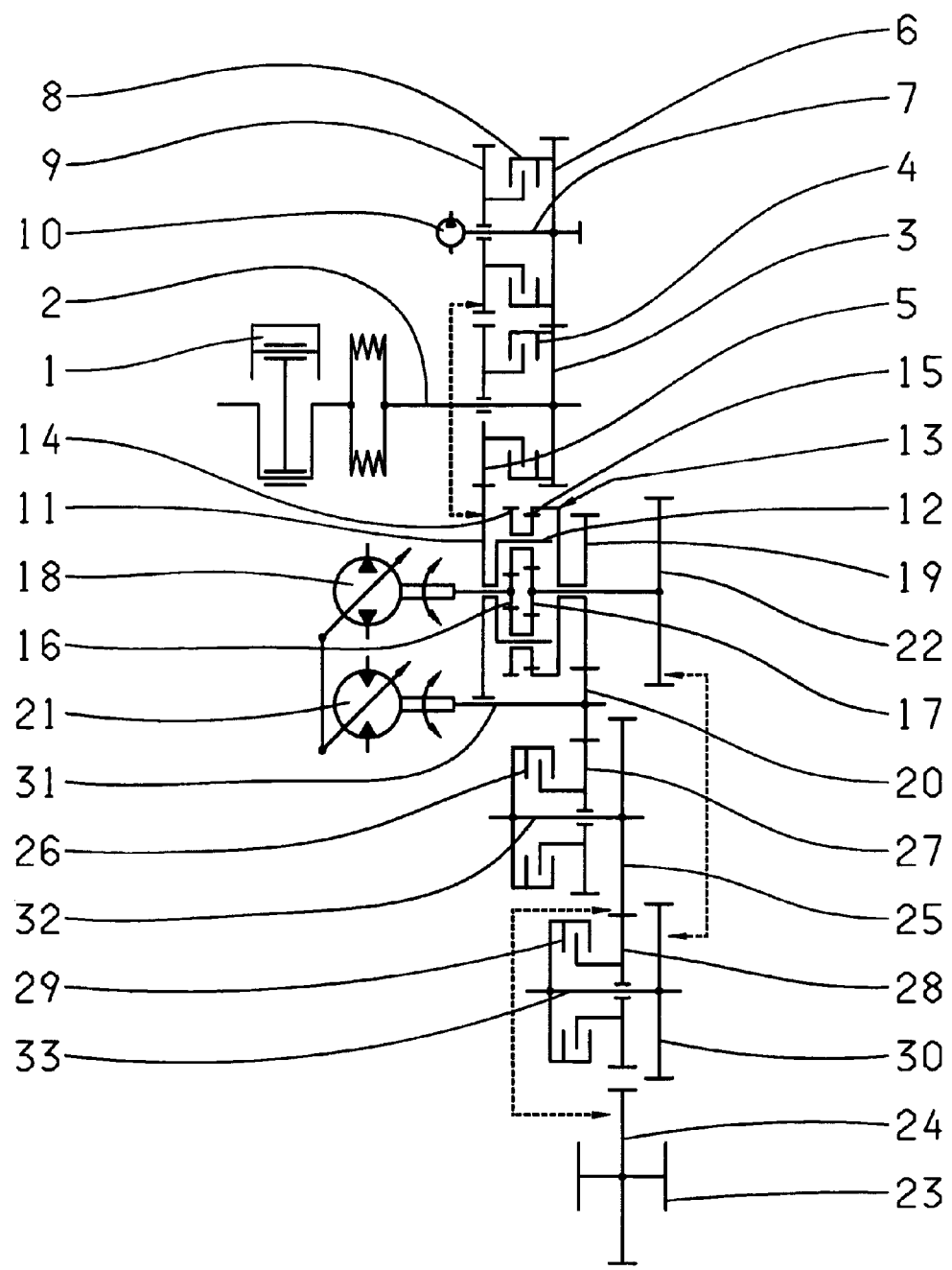
FIG. 1 a power split transmission with two operating ranges for forward drive and two operating ranges for reverse drive.
Figure 2:
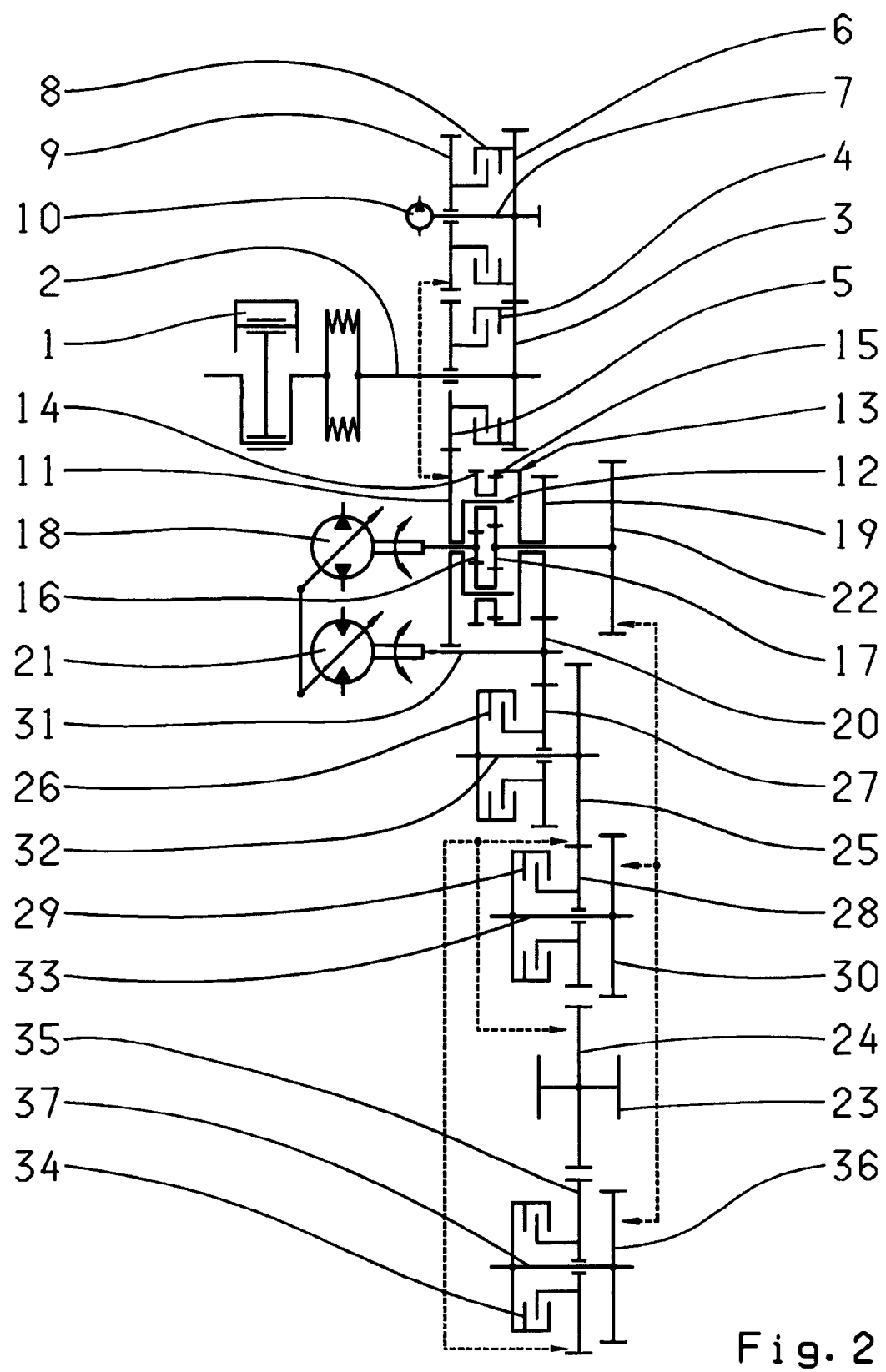
FIG. 2 a power split transmission with three operating ranges for forward drive and three operating ranges for reverse drive.

A drive motor 1 drives the input drive shaft 2 for the power split transmission. The drive shaft 2 is connected in a rotationally fixed manner, to a spur gear 3, designed as a fixed gear, and a clutch for forward drive 4. An idler 5 that is connected in a rotationally fixed manner to the clutch for forward drive 4, is located on the input drive shaft 2. The spur gear 3 meshes with a spur gear 6 designed as a fixed gear, which is connected in a rotationally fixed manner, to the shaft 7. The clutch for forward drive 8 is positioned on the shaft 7 and is connected in a rotationally fixed manner to the spur gear 6. The idler 9 is placed on the shaft 7 and is connected in a rotationally fixed manner to the clutch for reverse drive 8. A consumer 10, for example a hydraulic pump, is driven by the shaft 7. The gear ratios are preferably chosen so that the shaft 7, and thus the consumer 10, has a greater rotational speed than the shaft 2. The idler 5 and the idler 9 mesh with the idler 11, which is connected in a rotationally fixed manner to the planet carrier 12 of the summing planetary gear set 13. The planet carrier 12 carries at least one double planetary gear 14, with the double planetary gear mating on the one hand with the ring gear 15 and on the other hand with the first sun gear 16 and the second sun gear 17. The first sun gear 16 is connected to the first continuously variable unit 18, for example a hydrostat. The ring gear 15 is connected, rotationally fixed, to the idler 19, which meshes with the spur gear 20 designed as a fixed gear. The spur gear 20 is connected to the second continuously variable unit 21, for example a hydrostat. The second sun gear 17 is connected in a rotationally fixed manner to the spur gear 22, which is designed as a fixed gear. The output drive 23 of the power split transmission is connected in a rotationally fixed manner to the spur gear 24, designed as a fixed gear, which can be connected, via the spur gear 25 designed as a fixed gear, to the clutch for the first operating range 26, and in the idler 27 to the spur gear 20, or, via the spur gear 25, the idler 28 can be connected to the clutch for the second operating range 29, and the spur gear 30 designed as a fixed gear can be connected to the spur gear 22. It is thus possible, by engaging the clutch for the first operating range 26 and disengaging the clutch for the second operating range 29, to operate the output drive 23 in a first operating range, and by disengaging the clutch 26 and engaging the clutch 29, to operate the output drive 23 in a second operating range. The gear ratios are established so that when the end of the first operating range is reached with the clutch 26 engaged, the idler 28 and the spur gear 30 rotate synchronously, so that the clutch 29 can be actuated in the engaging direction with no differential rotational speed. Because of the structural space, it may also be necessary to divide the gear train consisting of the idler 19, the spur gear 20, and the idler 27, into two pairs of gears, whereby two spur gears are placed on the shaft 31 in the form of fixed gears. This makes it possible to provide a larger gear ratio.

Because the shaft 2, the shaft 7, and the shafts 31, 32, and 33 are positioned separated from one another, and only a single clutch is placed on each of these shafts, a power split transmission can be provided that has a compact design and has a large axial separation.

FIG. 2:

This differs from FIG. 1 only in that a third operating range is present in addition. A clutch for a third operating range 34 connects the idler 35 with the spur gear 36, designed as a fixed gear, to switch to a third operating range, with the spur gear 36 meshing with the spur gear 30 or the spur gear 22, and the idler 35 meshing with the spur gear 25. A first operating range is engaged by actuating the clutch for the first operating range 26 in the engaging direction and actuating the clutch for the second operating range 29 and the clutch for the third operating range 34 in the disengaging direction, a second operating range is engaged by actuating the clutch 29 for the second operating range in the engaging direction and the clutch 26 and the clutch 34 in the disengaging direction, and a third operating range is engaged by actuating the clutch 34 in the engaging direction and actuating the clutch 26 and 29 to disengage.

REFERENCE LABELS

1 Drive motor
2 Input drive shaft
3 Spur gear
4 Clutch for forward drive
5 Idler
6 Spur gear
7 Shaft
8 Clutch for reverse drive
9 Idler
10 Consumer
11 Idler
12 Planet carrier
13 Summing planetary gear set
14 Double planetary gear
15 Ring gear
16 First sun gear
17 Second sun gear
18 First continuously variable unit
19 Idler
20 Spur gear
21 Second continuously variable unit
22 Spur gear
23 Output drive
24 Spur gear
25 Spur gear
26 Clutch for the first operating range
27 Idler
28 Idler
29 Clutch for the second operating range
30 Spur gear
31 Shaft
32 Shaft
33 Shaft
34 Clutch for the third operating range
35 Idler
36 Spur gear
37 Shaft

The invention claimed is:

1. A power split transmission comprising a continuously variable branch and a mechanical branch, the continuously variable and the mechanical branches being summed with one another by a summing gear set (13) designed as a planetary gear set, the transmission having at least first and second operating ranges that can be switched via first and second operating range clutches (26, 29), and a forward drive clutch (4) and a reverse drive clutch (8), and shafts (32, 33) on which gears (27, 25, 28, 30) and the first and the second operating range clutches (26, 29) being supported, only one of the clutches (4, 8; 26, 29) being supported on each shaft (2, 7; 32, 33), and the shafts (2, 7; 32, 33) being positioned spaced apart from one another, the summing gear set (13) comprising a ring gear (15) and at least one double planetary gear (14) supported by a planet carrier (12) and engaged with the ring gear (15), and first and second sun gears (16, 17), and the planet carrier (12) being connected to an input drive (2) via the forward drive clutch (4) and the reverse drive clutch (8); and at least one consumer (10) is connected to a shaft (7) to which the reverse drive clutch (8) is connected.

2. The power split transmission according to claim 1, wherein the second sun gear (17) is connected to a first continuously variable unit (18) and the ring gear (15) is connected to a second continuously variable unit (21).

3. The power split transmission according to claim 2, wherein the second continuously variable unit (21) is in active connection with an output drive (23) via the first operating range clutch (26).

4. The power split transmission according to claim 1, wherein the forward drive clutch (4) is coaxial with the input drive (2).

5. The power split transmission according to claim 1, wherein the shaft (7), which is connected to the reverse drive clutch (8), has a greater rotational speed than the input drive (2).

6. A power split transmission comprising a continuously variable branch and a mechanical branch, the continuously variable and the mechanical branches being summed with one another by a summing gear set (13) designed as a planetary gear set, the transmission having at least first and second operating ranges that can be switched via first and second operating range clutches (26, 29), and a forward drive clutch (4) and a reverse drive clutch (8), and shafts (32, 33) on which gears (27, 25, 28, 30) and the first and the second operating range clutches (26, 29) being supported, only one of the clutches (4, 8; 26, 29) being supported on each shaft (2, 7; 32, 33), and the shafts (2, 7; 32, 33) being positioned spaced apart from one another, the summing gear set (13) comprising a ring gear (15) and at least one double planetary gear (14) supported by a planet carrier (12) and engaged with the ring gear (15), and first and second sun gears (16, 17), and the planet carrier (12) being connected to an input drive (2) via the forward drive clutch (4) and the reverse drive clutch (8); and the second sun gear (17) is in active connection with an output drive (23) via a third operating range clutch (34).

7. A power split transmission comprising a continuously variable branch and a mechanical branch, the continuously variable and the mechanical branches being summed with one another by a summing gear set (13) designed as a planetary gear set, the transmission having at least first and second operating ranges that can be switched via first and second operating range clutches (26, 29), and a forward drive clutch (4) and a reverse drive clutch (8), and shafts (32, 33) on which gears (27, 25, 28, 30) and the first and the second operating range clutches (26, 29) being supported, only one of the clutches (4, 8; 26, 29) being supported on each shaft (2, 7; 32, 33), and the shafts (2, 7; 32, 33) being positioned spaced apart from one another, the summing gear set (13) comprising a ring gear (15) and at least one double planetary gear (14) supported by a planet carrier (12) and engaged with the ring gear (15), and first and second sun gears (16, 17), and the planet carrier (12) being connected to an input drive (2) via the forward drive clutch (4) and the reverse drive clutch (8); and the second sun gear (17) is in active connection with an output drive (23) via a third operating range clutch (34).

8. A power split transmission comprising a continuously variable branch and a mechanical branch, the continuously variable and the mechanical branches being summed with one another by a summing gear set (13) designed as a planetary gear set, the transmission having at least first and second operating ranges that can be switched via first and second operating range clutches (26, 29), and a forward drive clutch (4) and a reverse drive clutch (8), and shafts (32, 33) on which gears (27, 25, 28, 30) and the first and the second operating range clutches (26, 29) being supported, only one of the clutches (4, 8; 26, 29) being supported on each shaft (2, 7; 32, 33), and the shafts (2, 7; 32, 33) being positioned spaced apart from one another, the summing gear set (13) comprising a ring gear (15) and at least one double planetary gear (14) supported by a planet carrier (12) and engaged with the ring gear (15), and first and second sun gears (16, 17), and the planet carrier (12) being connected to an input drive (2) via the forward drive clutch (4) and the reverse drive clutch (8); and gear ratios are such that, when shifting from the first operating range to the second operating range, the second operating range clutch (29) has a synchronous rotational speed.

9. A power split transmission comprising a continuously variable branch and a mechanical branch, the continuously variable and the mechanical branches being summed with one another by a summing gear set (13) designed as a planetary gear set, the transmission having at least first and second operating ranges that can be switched via first and second operating range clutches (26, 29), and a forward drive clutch (4) and a reverse drive clutch (8), and shafts (32, 33) on which gears (27, 25, 28, 30) and the first and the second operating range clutches (26, 29) being supported, only one of the clutches (4, 8; 26, 29) being supported on each shaft (2, 7; 32, 33), and the shafts (2, 7; 32, 33) being positioned spaced apart from one another, the summing gear set (13) comprising a ring gear (15) and at least one double planetary gear (14) supported by a planet carrier (12) and engaged with the ring gear (15), and first and second sun gears (16, 17), and the planet carrier (12) being connected to an input drive (2) via the forward drive clutch (4) and the reverse drive clutch (8); and the continuously variable power branch has two inclined axle hydraulic units which are adjustable through a common yoke.

10. A power split transmission comprising:
a continuously variable branch and a mechanical branch being summed by a summing gear set (13), and the summing gear set (13) comprising a planetary gear set having at least first and second operating ranges;
an input shaft (2) being coupled to a forward drive clutch (4) for implementing forward drive when the forward drive clutch (4) is engaged;
a first shaft (7) being coupled to a reverse drive clutch (8) for implementing reverse drive when the reverse drive clutch (8) is engaged;
a second shaft (32) supporting gears (25, 27) and being coupled to only a first operating range clutch (26);
a third shaft (33) supporting gears (28, 30) and being coupled to only a second operating range clutch (29), and the third shaft (33) being spaced from the second shaft (32);
each of the at least the first and the second operating ranges being implemented by engagement of one of the first and the second operating range clutches (26, 29) of the second and third shafts (32, 33) and disengaging the other of the second and the first operating range clutches (26, 29) of the second and third shafts (32, 33); and
the summing gear set (13) comprising a ring gear (15), first and second sun gears (16, 17) and at least one double planet gear (14) which is rotatably supported by a planet carrier (12) and engages the ring gear (15), and the planet carrier (12) being connectable to the input shaft (2) via the reverse drive clutch (8) and the forward drive clutch (4).

* * * * *